Feb. 21, 1956 A. A. POWELL 2,735,423
EYE EXERCISING DEVICE
Filed Jan. 29, 1954 3 Sheets-Sheet 1

INVENTOR
ALFRED A. POWELL
BY
ATTORNEYS

Feb. 21, 1956   A. A. POWELL   2,735,423
EYE EXERCISING DEVICE
Filed Jan. 29, 1954   3 Sheets-Sheet 3

INVENTOR
ALFRED A. POWELL
BY
ATTORNEYS

United States Patent Office 2,735,423
Patented Feb. 21, 1956

2,735,423
EYE EXERCISING DEVICE
Alfred A. Powell, Fairfax, Va.
Application January 29, 1954, Serial No. 407,185
8 Claims. (Cl. 128—76.5)
(Granted under Title 35, U. S. Code (1952), sec. 266)

The invention described herein may be manufactured and used by or for the Government of the United States of America for governmental purposes without the payment of any royalties thereon or therefor.

The present invention relates to an orthoptic training device, more particularly to a simplified instrument for treating astigmatism and strabismus in the human eye.

In the past, instruments have been devised for exercising the eyes of an individual to correct certain known defects. These instruments are designated as orthoptic devices since the purpose of them is to correct the defective vision of persons having strabismus or muscular insufficiency by stereoscopic and other ocular exercises of a gymnastic nature. The present invention lies in this field.

Previous orthoptic devices as disclosed by the prior art appear to have several shortcomings. Usually such a device is so complicated in nature that it is impossible for the patient himself to operate it while he is undergoing treatment. Also, the optic principles on which the operation of such an instrument is based are so complex that the layman is unable to operate the device in such a manner as to derive any benefit therefrom. The design of some orthoptic devices has been of such a nature that treatment by the device failed to substantially correct the defect for which it was intended to be used. Indeed in some cases the user of such an instrument actually suffered detrimental effects therefrom. The present invention eliminates the above shortcomings by being extremely simple in structure and by utilizing sound optic principles.

As the eye is an organ which receives light to create an image therein, the principles used in virtually all orthoptic devices is that of moving a light in a prearranged manner with the eye being exercised by following said light. As will be shortly explained, the present invention also is based upon this principle.

A modification of the present invention is also disclosed. The invention and the modification thereof are each especally adapted to treat a specific defect of the eye. While it is possible that the present invention may be used to execise the eye in a general manner, the instruments disclosed herein are peculiarly adapted to the treatment of strabismus and astigmatism.

In order that the operation of the present invention may be more easily understood, it may be helpful at this point to briefly discuss the nature of the defects for which this invention is intended. This invention is especially adapted for treating astigmatism. Astigmatism is that condition of the eye in which rays of light from a point do not converge to a point on the retina. This is usually due to an inequality of curvature of the different meridians of the cornea. Astigmatism usually occurs along only one meridian of the eye, although it occasionally occurs in two or more meridians of the same eye. It is therefore possible to correct to some extent an astigmatic eye by exercising the external ocular muscles in the plane of the abnormal meridian. The present invention uses precisely this method in treating an eye for astigmatism. A pair of spaced lights are adjusted to the angle corresponding to the angle of the abnormal meridian in the astigmatic eye. The lights are then illuminated alternately and the eye follows the shifting light.

Strabismus, or squint, is an abnormality of the eye in which the visual axes do not meet at the desired objective point, in consequence of incoordinate action of the external ocular muscles. Strabismus may be either convergent, in which the squinting eye is turned to the nasal side, or divergent, in which the squinting eye is turned to the temporal side. It is therefore apparent that in order to correct strabismus it is necessary that the exercises be such that the visual axis of the squinting eye is brought to the normal position. The modification of the present invention provides for the treating of strabismus by disclosing a device wherein a pair of lights, upon which the patient focuses his eyes, are adjusted until they appear to be superimposed. The distance between said lights is then gradually reduced.

It is therefore an object of this invention to provide an orthoptic training device which is simple in structure, may easily be operated by the patient undergoing treatment, and is based on sound optic principles.

Another object of the invention is to provide an orthoptic instrument which subjects the eyes to such training that normal visual habits are induced therein.

A further object of the invention is to provide a visual training device wherein a plurality of lights are lit in a predetermined pattern which is especially adapted to treat the eye for astigmatism and strabismus.

Other objects and many of the attendant advantages of this invention will be readily appreciated as the same becomes better understood by reference to the following detailed description when considered in connection with the accompanying drawings wherein.

Figure 1:
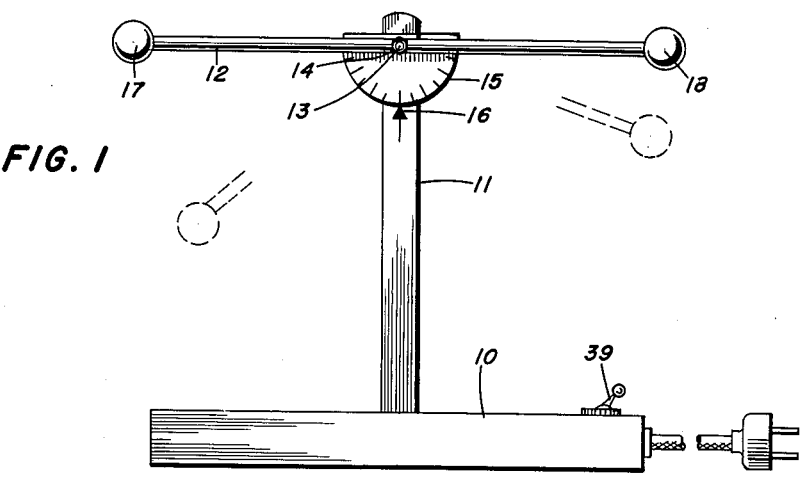
Fig. 1 is a front elevational view of one embodiment of the invention.

Referring to the drawings wherein like reference characters indicate corresponding parts throughout the several drawings, the numeral 10 (Fig. 1) indicates a body or base member for the orthoptic instrument. Said base member 10 is in the form of a hollow rectangular container closed on all sides thereof.. A preferably hollow supporting member 11 is perpendicularly affixed to a face of the base member 10. An arm 12 is pivotally mounted by means of a threaded bolt 13 at its center on the upper end of said supporting member 11 so as to be able to pivot in a vertical plane thereon. The arm 12 is retained on the bolt 13 by a nut 14. A protractor 15 is fastened at the center of the arm 12. An indicating mark 16 on the vertical supporting member 11 cooperates with the protractor so as to indicate the precise angle at which the arm 12 is fixed.

Lights 17 and 18 are mounted on opposite ends of the arm 12. These lights are preferably achromatic, or white, when the invention is being used for the treatment of astigmatism. However, colored lights or lights with Polaroid filters may, if desired, be used in a manner to be described later.

Figure 2:
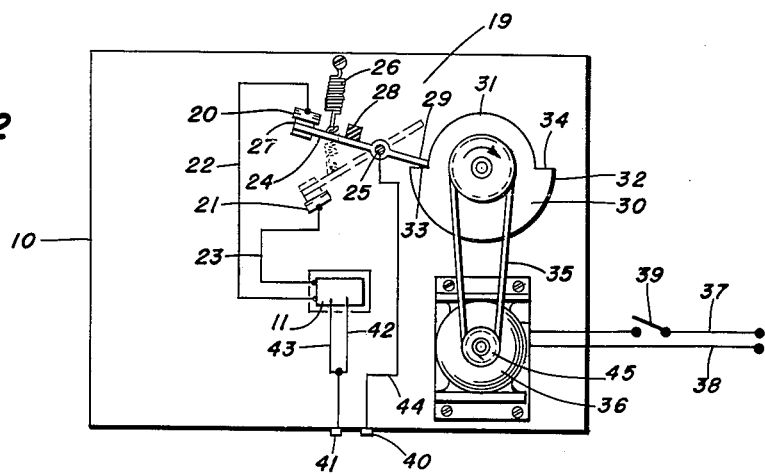
Fig. 2 is a bottom plan view of the invention illustrated in Fig. 1.

Fig. 2 shows the interior of the base 10 from below and the numeral 19 generally indicates the control means which switches on the lights 17 and 18 alternately. The control means 19 includes a pair of contacts 20 and 21, with the contact 20 being electrically connected by the conductor 22 to the light 18, and the contact 21 being electrically connected by the conductor 23 to the light 17. A contact arm 24 is pivotally mounted at 25 so as to be able selectively to engage each of the contacts 20 and 21. In the instrument illustrated, the contact arm 24 is biased by means of a spring 26 in such a manner that a contact end 27 of said arm is brought into electrical contact with the contact 20. The contact end 27 is then positioned by a stop 28 which halts the motion of the contact arm 24 at the point where the contact end 27 is in electrical contact with the contact 20.

The opposite end 29 of the contact arm 24 is engageable with a cam 30. The cam 30 is provided with a low portion 31 and a raised portion 32. These portions are joined by shoulders 33 and 34. The cam 30 may be rotated by any suitable means such as belt 35 which is driven by an electric motor 36. Other driving means such as suitable gearing may be employed in place of the belt 35. Conductors 37 and 38 lead from the electric motor to a suitable source of electric energy. A switch 39 may be placed in the conductor 37.

Figure 3:
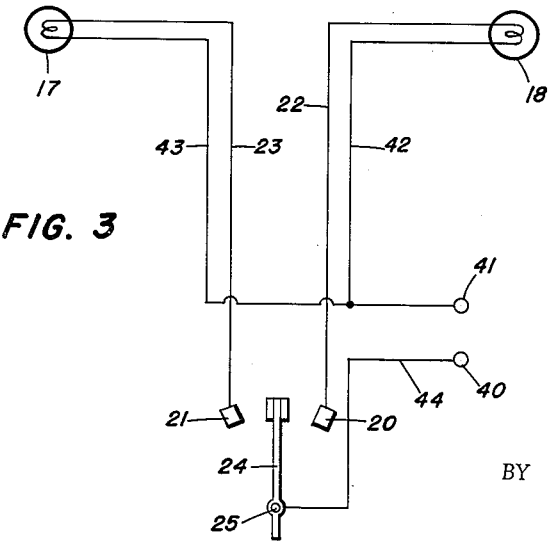
Fig. 3 is a schematic wiring diagram of the circuity utilized in the invention illustrated in Figs. 1 and 2.

In Fig. 3 a pair of terminals 40 and 41 are provided to be connected to a suitable source of electric energy for the lights 17 and 18. Conductor 42 from the light 18 and conductor 43 from the light 17 are both connected to the terminal 41. A conductor 44 connects the cam pivot 25 to the terminal 40.

When the invention is to be used in the treatment of an eye for astigmatism, the invention operates in the following manner: The arm 12 is adjusted and fixed by means of the nut and bolt 13 and 14 at the angle corresponding to the angle at which the astigmatism occurs in the eye which is to be treated. The switch 39 is thrown to energize the electric motor 36. The energization of the motor 36 causes the cam 30 to rotate in a clockwise direction as indicated in Fig. 2. When the motor comes up to the desired speed, the terminals 40 and 41 are connected to a source of electrical energy to illuminate the lights 17 and 18. When the cam 30 rotates, the shoulder 33 on the cam 30 will move the contact arm 24 so that the contact end 27 of the contact arm will come into electrical contact with the contact 21. The cam raised surface 32 will hold the cam end 29 of the contact arm so as to maintain the end 27 thereof in continuous contact with the contact 21. When the shoulder 34 reaches the cam end 29 of the contact arm 24, the contact arm under the action of the spring 26 will return to engage the end 27 with the contact 20. It may thus be seen that as a result of the design of the cam 30 the contact arm 24 remains in contact with each of the contacts 20 and 21 for one half a revolution of the cam 30. This results in alternate lighting of the lights 17 and 18. The eye being treated then follows this shifting light throughout the duration of the treatment. Pulley 45 of suitable size is selected to rotate cam 30 at the desired speed or a suitable speed control means may be used if the motor is of a variable speed type.

This instrument may also be used in the treatment of strabismus in an eye by making a small modification therein. The arm 12 is first adjusted to the horizontal position. In the case of convergent strabismus, a red light is substituted for the light 18 and a green light substituted for the light 17. The patient then puts on a pair of goggles in which the right lens is red and the left lens is green. As a result, the right eye of the patient will be responsive only to the red light 18 and the left eye of the patient will be responsive to the green light 17. The control means 19 is then set into operation to cause alternate lighting of the lights 17 and 18. The patient then looks straight ahead at the arm 12. When the red light 18 is lit, the right eye will be drawn to the red light, and the same will be true for the left eye only when the green light is lit. As a result the convergent lines of vision will be repeatedly drawn back to their normal axes.

In the case of divergent strabismus, either the colors of the lens in the goggles or the colors of the lights 17 and 18 may be reversed. Therefore, when the light 17 is lit the right eye will be drawn from its divergent position over to the light 17. The left eye, of course, will be drawn over to the light 18. In this manner the divergent lines of vision will be repeatedly drawn back to their normal axes.

Both of these treatments are intended for the case where both eyes are afflicted with either convergent or divergent strabismus. If strabismus is in only one eye, the normal eye should be covered when said one eye is being exercised.

Another use of the embodiment of Fig. 1 for treatment of strabismus in an eye is to place a filter which polarizes the light in a horizontal direction over the white light 18 and a lens or filter which polarizes the light in a vertical direction over the light 17. The operator then places over his eyes a set of goggles in which the right lens is polarized in a horizontal direction and the left lens is polarized in a vertical direction. By use of these corresponding lenses both on the lights 17 and 18 and in the goggles it is possible for either eye to see only one light. The control means is then started to function in the manner as described above to illuminate the lights 17 and 18 alternately.

Figure 4:
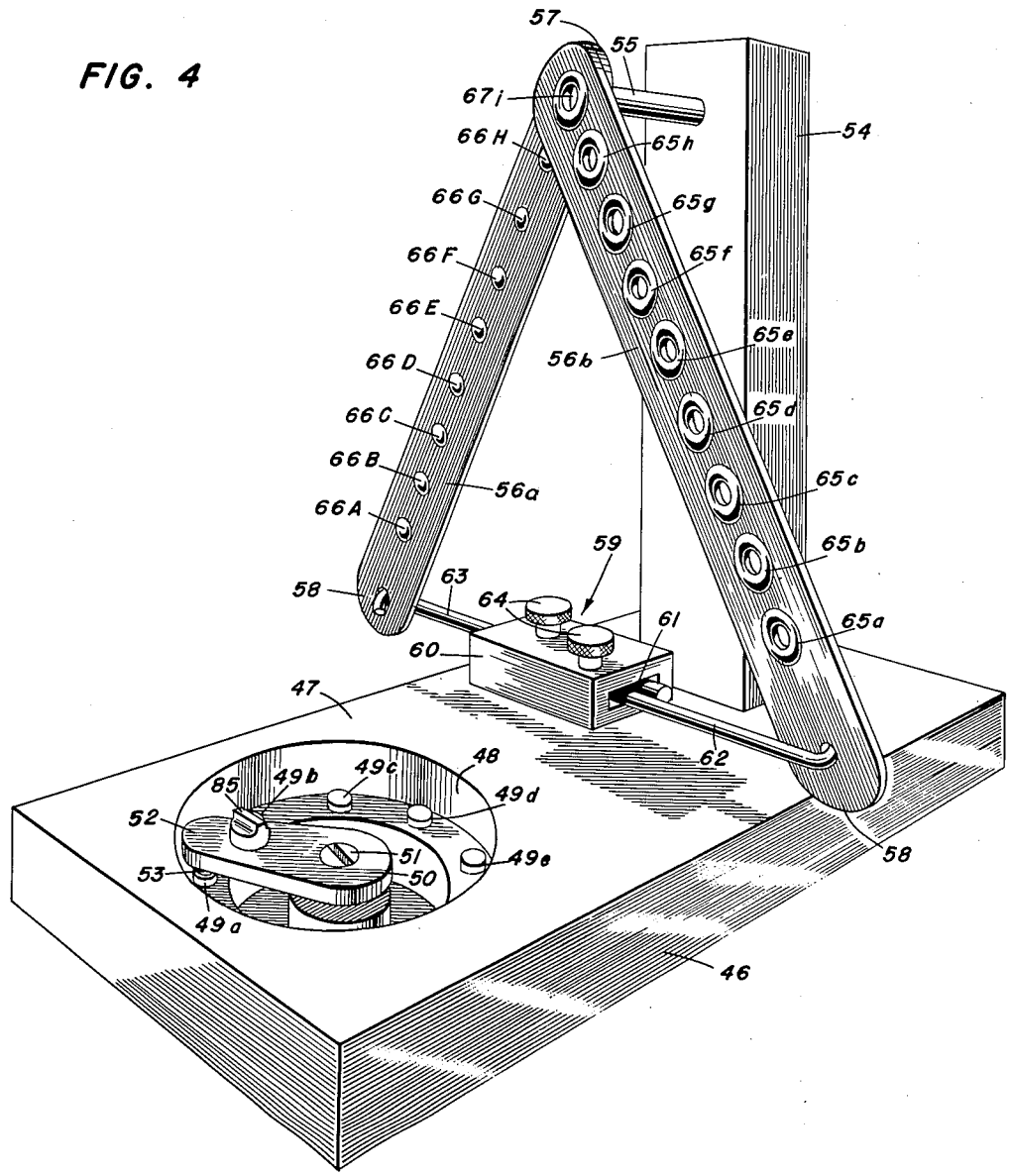
Fig. 4 illustrates in perspective a second embodiment of the present invention.
Figure 5:
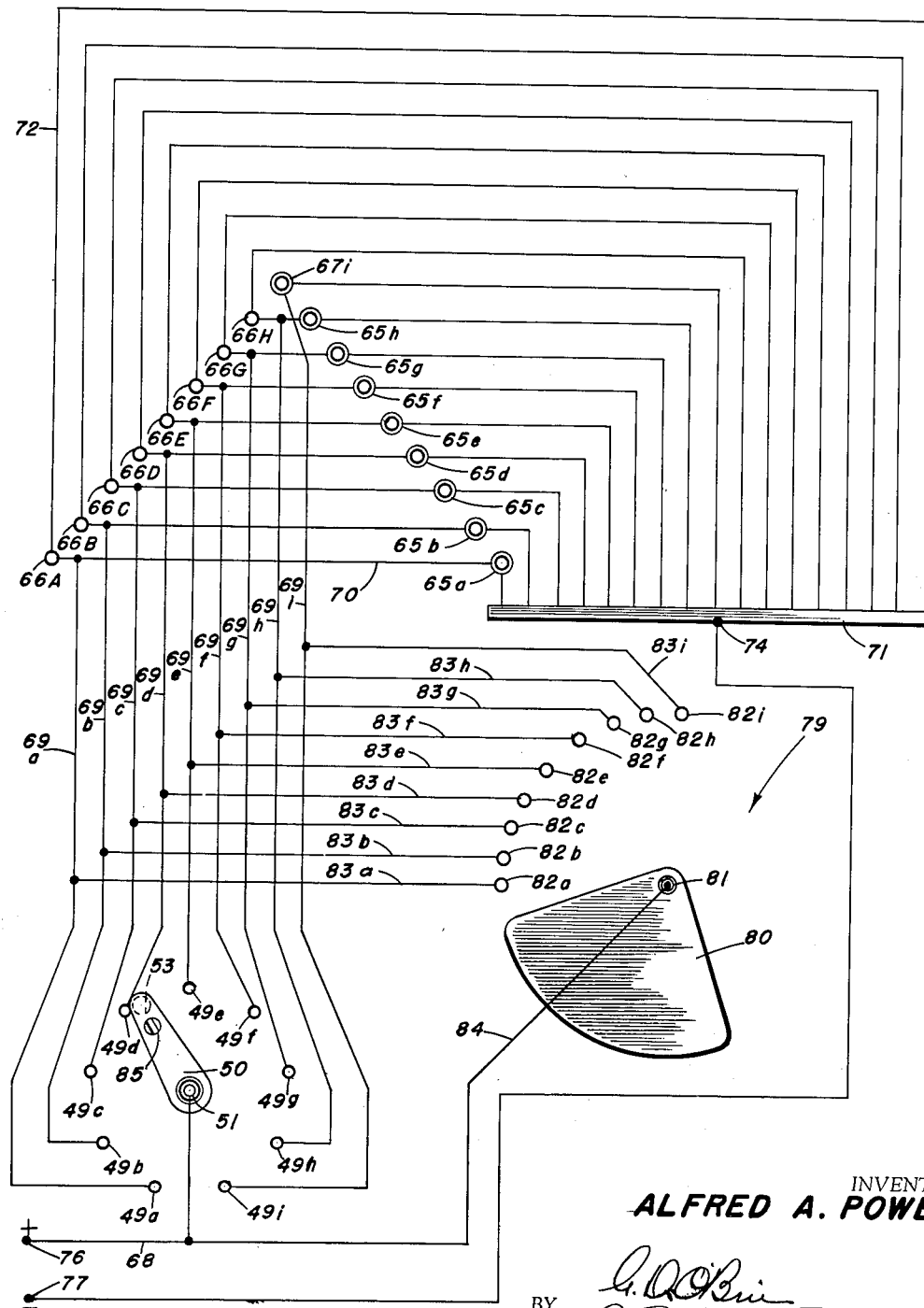
Fig. 5 is a schematic wiring diagram of the circuity utilized in the embodiment illustrated in Fig. 4.

A modification of this invention which is particularly adapted for the treatment of strabismus in the eye is illustrated in Figs. 4 and 5. This modification comprises a hollow rectangular base member 46 having a flat-surfaced upper face 47. A plurality of annularly arranged contacts 49a to i are mounted within a central depression in base member 46 and aligned with the annular opening 48. A preferably manually operated control lever 50 having a handle 85 is pivotally mounted at one end thereof at the point 51 on the base surface 47 in the center of the annular opening 48. Of course this control lever 50 may be motor driven if desired. On the undersurface of the outer end 52 of the lever 50 a contact 53 is mounted so as to progressively wipe over the annularly arranged contacts 49a to i.

A supporting member 54, preferably hollow, is perpendicularly affixed to the flat surface 47 near one end. The hollow interior of the vertical support 54 provides a convenient conduit for the placing of the wiring necessary for the invention.

A hollow horizontal arm 55 projects from the upper part of the supporting member 54 and a pair of laterally depending arms 56a and 56b are pivotally mounted on the free end 57 of the supporting arm 55. The arms 56a and 56b have a length several times their width as is indicated in Fig. 4 and may be relatively thin in cross section. The lower ends 58 of these arms are held apart by an adjustable means indicated generally at 59 so that the arms 56a and 56b form an angle with each other. The adjustable means 59 includes a block 60 with a longitudinal passage 61 therethrough which is of sufficient width to accommodate side by side the rods 62 and 63 each of which engages a lower end 58 of an arm 56a or 56b. Thumb screws 64 are mounted in the block 60 in such a manner as to clamp the rods 62 and 63 so as to fix said rods in the position desired.

A plurality of spaced equal-sized lights 65a to h of annular or ring shape and which may all be red in color are mounted along the front face of arm 56b. A like plurality of spaced small equal-sized round lights 66A to H which in this embodiment may all be green in color, are mounted on the front surface of the other arm 56a. Each of the round lights 66A to H has an external diameter which is about the same size as, or somewhat less than the internal diameter of the annular lights 65a to h. The annular lights 65a to h are so spaced on the arm 56b that each annular light is horizontally aligned with its corresponding round light 66A to H occupying the same relative position on the arm 56a so as to form a corresponding pair of lights as, for example, 65a and 66A in Fig. 4. A combined annular and round light 67i is located at the pivotal point of the arms 56a and 56b. Said combined light 67i consists of a red outer annulus of light with a circular green light placed within. Fig. 4 discloses that each of the arms 56a and 56b has a total of 8 lights spaced thereon plus the combined light 67i but of course any desired number of lights may be employed.

A wiring diagram of the circuit which may be used to control this instrument is illustrated in Fig. 5. The circuit will be traced for only one pair of lights as a similar circuit is used for each of the pairs of lights of the invention. A lead 68 runs from a terminal 76, which is one of the two terminals 76 and 77 connected to a suitable source of electric energy, to the control lever 50, and subsequently to the contact 53 mounted on the undersurface of end 52 of said control lever. An electric conductor 69a connects the fixed contact 49a with an electric conductor 70 which connects the corresponding pair of lights 65a and 66A in parallel. The light 66A is electrically connected to a terminal board 71 by the conductor 72 and the light 65a is connected to the terminal board 71 by an electrical conductor 73. All the terminals on the terminal board 71 to which the electric conductors leading from lights 65a to h and 66A to H are connected are electrically connected to a single terminal 74. A lead 75 then connects the terminal 74 to the terminal 77 of the two terminals 76 and 77. It will be apparent that a similar circuit is provided for each of the remaining pairs of lights and that such circuits will be successively energized as the arm 50 sweeps over the contacts. In the interest of neater construction it is desirable that all said wiring be located within the base member 46, the supporting member 54, and the supporting arm 55.

The modification of the invention disclosed in Fig. 4 may be readily adapted to exercise visual depth perception. Fig. 5 shows that this is done by inserting a collector switch assembly, indicated generally as 79, in parallel with control switch 50. The collector switch assembly 79 comprises a sector-shaped contact member 80 which is pivotally mounted at the point 81. The sector 80 may be manually operated or pivoted by any other suitable form of driving means. A plurality of contacts 82a to i are arranged in an arc of a circle so that each contact is successively engaged by the sector 80. The contacts 82 are connected to corresponding pairs of lights on the arms 56a and 56b by conductors 83a to i, each of which connects to the appropriate conductors 69a to i. A conductor 84 connects the main line conductor 68 to the sector 80.

When it is desired to exercise the depth perception of the individual the sector 80 is rotated by hand or by suitable power means so that the outer end of the sector wipes over contacts 82b to i successively. Because of the sector shape, the contacts which have been previously engaged by the sector 80 remain energized until the last one has been energized. Consequently, as each pair of lights on the arms 56a and 56b is lighted, the lights previously lighted remain lit. It is this successive lighting of the differently spaced pairs of lights which creates an impression of depth to the eyes of an individual following these lights. By imparting this impression of depth, the eyes under treatment will gradually learn a normal degree of depth perception. By rotating the collector sector in the proper direction the pairs of lights may be lighted either from top to bottom or vice versa. The order in which the said lights are lit will be suggested by the optometrist.

The invention disclosed in Fig. 4 is particularly adapted for the treatment of strabismus. Assuming that the individual to be treated has convergent strabismus, or as colloquially expressed is "cross-eyed," the first step in the treatment is to place a pair of goggles over the eyes of the individual. As the individual faces the instrument, the red annular lights 65a to h will be to the right of the small green lights 66A to H. The goggles placed upon the individual have a green lens over the right eye and a red lens over the left eye. The individual then looks at the two lower lights 65a and 66A and by means of the adjustable means 59 the arms 56a and 56b are fixed at such an angle that the small green light 66A appears to the individual to be within the annulus of the red light 65a. By means of the control lever 50 successive ascending pairs of lights from 66B—65b to 66H—65h are lighted in sequence. The right eye, being covered by a green lens, is responsive only to green light and will follow the lights 66A to H as they are lit. The left eye being covered with a red lens will follow the lights 65a to h for the same reason. Thus, as the lights are sequentially lit the visual axes of both eyes will be gradually drawn to the outside. However, in use when a green light does not appear to the observer to be within the red annulus, progress upwardly should be discontinued. The lights 65a and 66A should be relit and the eyes returned thereto. As these treatments are continued the observer will be able to proceed nearer to the combined light 67i before a pair of lights appears to be out of focus. When the condition of strabismus has been corrected the individual will be able to focus on the combined light 67i and it will appear to him as a green circle within a red annulus. However, it is pointed out that treatment may be continued, preferably with automatic control of lever 50, in order to build up reserve eye control.

In order to treat an individual for divergent strabismus, or a condition colloquially known as "wall-eye," the colored lens in the goggles are reversed so that the red lens is over the right eye and the green lens is over the left eye. The remainder of the treatment is essentially the same as discussed for convergent strabismus. As the right eye can only see the red annulus of light and the left eye the round green light, the lighting of successive pairs of lights will tend to draw the divergent visual axes back to a normal position. Here, also, when the observer is able to focus on the combined light 67i, he will know his condition has been corrected.

Obviously many modifications and variations of the present invention are possible in the light of the above teachings. It is therefore to be understood that within the scope of the appended claims the invention may be practiced otherwise than as specifically described.

What is claimed is:

1. In an optical exercising device, the combination comprising a stationary hollow base member, a stationary hollow vertical supporting member affixed to said base member, arm means pivotally mounted on the free end of said vertical member so as to pivot in a vertical plane, adjustable means to vary and fix the angular position of said arm means with respect to said vertical member to thereby lock said arm means and said vertical member in a predetermined locked angular relationship, a plurality of spaced colored lights mounted on said arm means along the length thereof, a plurality of stationary contacts fixed within said base member, said plurality of contacts corresponding in number to said plurality of lights, a pivotally mounted contact arm mounted within said base member in such a manner to contact each of said contacts in a predetermined sequence, and electrical conductors located within said vertical member and connecting said contacts to said lights.

2. An optical exercising device comprising a base member, a vertical member affixed to said base member, an arm pivotally mounted on the free end of said vertical member, means to adjust and fix the angular position of said arm with respect to said vertical member, a pair of different colored spaced lights mounted on said arm, and control means for said colored lights comprising, a pair of fixed contacts, electrical conductors connecting said contacts with said lights, a pivoted contact arm connected to a current source and spring biased to electrically engage one of said contacts and movable to engage the other of said contacts, a cam means having a suface engageable with the free end of said contact arm, said cam means adapted to move said contact arm away from the contact against which said contact arm is biased and into contact with the other contact and to permit said arm to return after a portion of a revolution of said cam means, thereby enabling said colored lights to be lighted alternately.

3. An optical exercising device comprising a base member, a vertical supporting member affixed to said base member, an arm pivotally mounted at its center on the free end of said vertical member so as to pivot in a vertical plane, adjustable means to vary and fix said arm at any angle relative to said vertical member, a light mounted on each end of said arm, each of said lights being of a different color, and control means in said base member for said colored lights comprising, a pair of contacts each of which is electrically connected to one of said lights, a pivoted contact arm connected to a current source and spring biased to electrically engage one of said contacts and movable to engage the other of said contacts, a motor-driven cam whose surface engages the free end of the contact arm, said cam adapted to move the contact arm away from the contact against which said arm is biased to contact with the other contact and to permit said arm to return after one-half revolution of the cam, thereby enabling said colored lights to be lighted alternately.

4. An optical exercising device comprising a base member, a plurality of fixed contacts mounted on said base member, a contact arm pivotally mounted so as to cooperate with said fixed contacts, a vertical supporting member affixed to said base member and spaced from said contacts, a supporting arm extending from said vertical member, a pair of arms pivotally mounted on said supporting arm so as to form an angle with each other, a plurality of pairs of horizontally spaced lights with each light of a pair being mounted on one of said arms, the lights on one arm being round and of one color, the lights on the other arm being annular and of another color, each of said round lights having an outer diameter less than the inner diameter of said annular lights, a combined annular and round light located at the juncture of the identical arms and having colors corresponding to the colors of said annular and round lights, adjustable means to vary and fix the angle between said arms, and electrical conductors connecting said contacts with said annular and round lights and providing for the selective and simultaneous illumination of any pair of lights or said combined light.

5. An optical exercising device comprising a base member, a plurality of fixed contacts mounted on said base member, a contact arm pivotally mounted so as to cooperate with said plurality of fixed contacts, a vertical supporting member affixed to said base member and spaced from said contacts, a supporting arm extending from said vertical member, a pair of substantially identical arms pivotally mounted on said supporting arm so as to form an angle with each other, a plurality of spaced annular lights of one color mounted on one arm, a like plurality of spaced round lights of another color mounted on the other arm, each of said round lights having an external diameter somewhat less than the internal diameter of any one of said annular lights, said lights being so spaced on their respective arms that each annular light is horizontally aligned with the round light occupying the same relative position on its arm so as to form a corresponding pair of lights, a combined annular and round light located at the juncture of the identical arms and having colors corresponding to the colors of said annular and round lights, adjustable means to vary and fix the angle between said arms, and electrical connections between said contacts and said annular and round lights to provide for the selective and simultaneous illumination of any pair of corresponding lights or the combined light.

6. An optical exercising device comprising, a hollow base member having a flat upper surface, an annular opening in said surface near one end thereof, a plurality of contacts annularly arranged within said base member and aligned with said annular opening, a contact arm pivotally mounted in the center of said annular opening, and cooperating with said plurality of contacts, a hollow supporting member mounted perpendicularly on said flat surface near the other end thereof, a hollow supporting arm projecting from said supporting member toward said annular opening, a pair of substantially identical arms pivotally mounted on the free end of said supporting arm so as to form an angle with each other, a plurality of spaced equal-sized annular lights of one color mounted on the front surface of one arm, a like plurality of spaced equal-sized round lights of another color mounted on the front surface of the other arm, each of said round lights having an external diameter somewhat less than the internal diameter of any one of said annular lights, said lights being so spaced on their respective arms that each annular light is horizontally aligned with the round light occupying the same relative position on its arm so as to form a corresponding pair of lights, a combined annular and round light located at the junction of the identical arms and having colors corresponding to the colors of said annular and round lights, adjustable means connecting the free ends of the identical arms to vary and fix the angle between said arms, and electrical connections between said annularly arranged contacts and said annular and round lights to provide for the selective and simultaneous illumination of any pair of corresponding lights or said combined light, said electrical connections being located within the base member, supporting member, and supporting arm.

7. An optical exercising device comprising, a hollow base member having a flat upper surface, an annular opening in said surface near one end thereof, a plurality of contacts annularly arranged within said base member and aligned with said annular opening, a contact arm pivotally mounted in the center of said annular opening and cooperating with said plurality of contacts, a vertical supporting member affixed to said flat surface near the other end thereof, a supporting arm projecting from said vertical member toward said annular opening, a pair of substantially identical arms pivotally mounted on the free end of said supporting arm so as to form an angle with each other, a plurality of spaced equal-sized annular lights of one color mounted on the front surface of one arm, a like plurality of spaced equal-sized round lights of another color mounted on the front surface of the other arm, each of said round lights having an external diameter somewhat less than the internal diameter of any one of said annular lights, said lights being so spaced on their respective arms that each annular light is horizontally aligned with the round light occupying the same relative position on its arm so as to form a corresponding pair of lights, a combined annular and round light located at the juncture of the identical arms and having colors corresponding to the colors of said annular and round lights, adjustable means connecting the free ends of the identical arms to vary and fix the angle between said arms, and electrical connections between said annularly arranged contacts and said annular and round lights to provide for the selective and simultaneous illumination of any pair of corresponding lights or said combined light.

8. An optical exercising device comprising a hollow base member having a flat upper surface, an annular opening in said surface near one end thereof, a plurality of contacts annularly arranged within said base member and aligned with said annular opening, control lever pivotally mounted at one end thereof in the center of said annular opening, a projection from said control lever extending through said annular opening into said base member, a contact on the free end of said projection to cooperate with said plurality of contacts, a hollow supporting member mounted perpendicularly on said flat surface near the other end thereof, a hollow supporting arm projecting from said supporting member toward said annular opening, a pair of substantially identical arms pivotally mounted on the free end of said supporting arm so as to form an angle with each other, a plurality of spaced equal-sized annular lights of one color mounted on the front surface of one arm, a like plurality of spaced equal-sized round lights of another color mounted on the front surface of the other arm, each of said round lights having an external diameter somewhat less than the internal diameter of any one of said annular lights, said lights being so spaced on their respective arms that each annular light is horizontally aligned with the round light occupying the same relative position on its arm so as to form a corresponding pair of lights, a combined annular and round light located at the juncture of the identical arms and having colors corresponding to the colors of the annular and around lights, adjustable means connecting the free ends of the identical arms to vary and fix the angle between said arms, and electrical connections between the annularly arranged contacts and the annular and round lights to provide for the selective and simultaneous illumination of any pair of corresponding lights or said combined light, said electrical connections being located within the base member, supporting member, and supporting arm.

References Cited in the file of this patent

UNITED STATES PATENTS

| | | |
|---|---|---|
| 704,513 | Campbell | July 15, 1902 |
| 1,802,997 | Yetta | Apr. 28, 1931 |
| 2,317,197 | Jacobson | Apr. 20, 1943 |
| 2,335,076 | Neumueller | Nov. 23, 1943 |
| 2,676,588 | Shamsky | Apr. 27, 1954 |